(12) United States Patent
Tulpule

(10) Patent No.: US 10,935,983 B2
(45) Date of Patent: Mar. 2, 2021

(54) COORDINATED CONTROL OF VEHICLE COHORTS

(71) Applicant: Cummins Inc., Columbus, IN (US)

(72) Inventor: Pinak Jayant Tulpule, Columbus, IN (US)

(73) Assignee: Cummins Inc., Columbus, IN (US)

( * ) Notice: Subject to any disclaimer, the term of this patent is extended or adjusted under 35 U.S.C. 154(b) by 179 days.

(21) Appl. No.: 16/174,752

(22) Filed: Oct. 30, 2018

(65) Prior Publication Data

US 2019/0129447 A1    May 2, 2019

Related U.S. Application Data

(60) Provisional application No. 62/579,478, filed on Oct. 31, 2017.

(51) Int. Cl.
| | | |
|---|---|---|
| *G05D 1/02* | (2020.01) | |
| *G08G 1/00* | (2006.01) | |
| *G05D 1/00* | (2006.01) | |
| *G05B 13/04* | (2006.01) | |

(52) U.S. Cl.
CPC ......... *G05D 1/0291* (2013.01); *G05B 13/042* (2013.01); *G05D 1/0011* (2013.01); *G05D 1/0217* (2013.01); *G05D 1/0293* (2013.01); *G08G 1/22* (2013.01); *G05D 2201/0213* (2013.01)

(58) Field of Classification Search
CPC .. G05D 1/0293; G05D 1/0291; G05D 1/0011; G05D 1/02; G08G 1/22; G05B 13/04; G05B 13/042

USPC .......................................................... 701/2
See application file for complete search history.

(56) References Cited

U.S. PATENT DOCUMENTS

| | | | |
|---|---|---|---|
| 8,744,666 B2 | 6/2014 | Switkes et al. | |
| 9,183,745 B2 | 11/2015 | Huber et al. | |
| 9,396,661 B2 | 7/2016 | Okamoto | |
| 9,494,944 B2 | 11/2016 | Alam et al. | |
| 9,582,006 B2 | 2/2017 | Switkes et al. | |
| 9,616,743 B1 * | 4/2017 | Mays .................... | B60W 10/30 |
| 9,940,840 B1 * | 4/2018 | Schubert ................... | B60F 1/00 |
| 2014/0316865 A1 * | 10/2014 | Okamoto ............. | G05D 1/0293 |
| | | | 705/14.1 |

(Continued)

FOREIGN PATENT DOCUMENTS

| | | |
|---|---|---|
| WO | 2016089438 | 6/2016 |
| WO | 2017035516 | 3/2017 |

*Primary Examiner* — Tan Q Nguyen
(74) *Attorney, Agent, or Firm* — Taft Stettinius & Hollister LLP

(57) ABSTRACT

Exemplary embodiments include unique apparatuses, methods and systems providing coordinated control of vehicle cohorts. Certain embodiments perform an optimization of a vehicle cohort model and a plurality of vehicle models to determine vehicle cohort operating parameters and individual vehicle operating parameters in order to minimize total vehicle cohort power or a total vehicle cohort energy over a route of travel. Such embodiments further determine vehicle operating commands executable by vehicles of the cohort to implement the vehicle cohort operating parameters and individual vehicle operating parameters. Such vehicle operating commands may be transmitted to, received by and, executed by vehicles of the vehicle cohort.

14 Claims, 4 Drawing Sheets

(56) References Cited

U.S. PATENT DOCUMENTS

2016/0267795 A1 9/2016 Miyazawa
2016/0267796 A1 9/2016 Hiroma et al.
2018/0113448 A1* 4/2018 Nagda ................. G05D 1/0293
2019/0073909 A1* 3/2019 Neubecker ............... B60Q 1/30

* cited by examiner

COORDINATED CONTROL OF VEHICLE COHORTS

CROSS REFERENCE

This application claims the benefit of and priority to U.S. Application No. 62/579,478 filed Oct. 31, 2017 which is hereby incorporated by reference.

BACKGROUND

The present application relates to coordinated control of vehicle cohorts. A number of techniques have been proposed for coordinating the operation of vehicle cohorts. Such proposals generally involve grouping vehicles into cohorts, sometimes referred to as platoons, and coordinating acceleration and braking of vehicles in the cohort in order to allow for a closer headway between vehicles by eliminating reacting distance needed for human reaction. Existing proposals suffer from a number of drawbacks and limitations. There remains a significant need for the unique apparatuses, methods, systems and techniques of coordinated control of vehicle cohorts disclosed herein.

DISCLOSURE OF ILLUSTRATIVE EMBODIMENTS

For the purposes of clearly, concisely and exactly describing illustrative embodiments of the present disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art.

SUMMARY OF THE DISCLOSURE

Exemplary embodiments include unique apparatuses, methods and systems providing coordinated control of vehicle cohorts. Certain embodiments perform an optimization of a vehicle cohort model and a plurality of vehicle models to determine vehicle cohort operating parameters and individual vehicle operating parameters in order to minimize total vehicle cohort power or a total vehicle cohort energy over a route of travel. Such embodiments further determine vehicle operating commands executable by vehicles of the cohort to implement the vehicle cohort operating parameters and individual vehicle operating parameters. Such vehicle operating commands may be transmitted to, received by and, executed by vehicles of the vehicle cohort. Further embodiments, forms, objects, features, advantages, aspects, and benefits shall become apparent from the following description and drawings.

DETAILED DESCRIPTION OF ILLUSTRATIVE EMBODIMENTS

Figure 1:
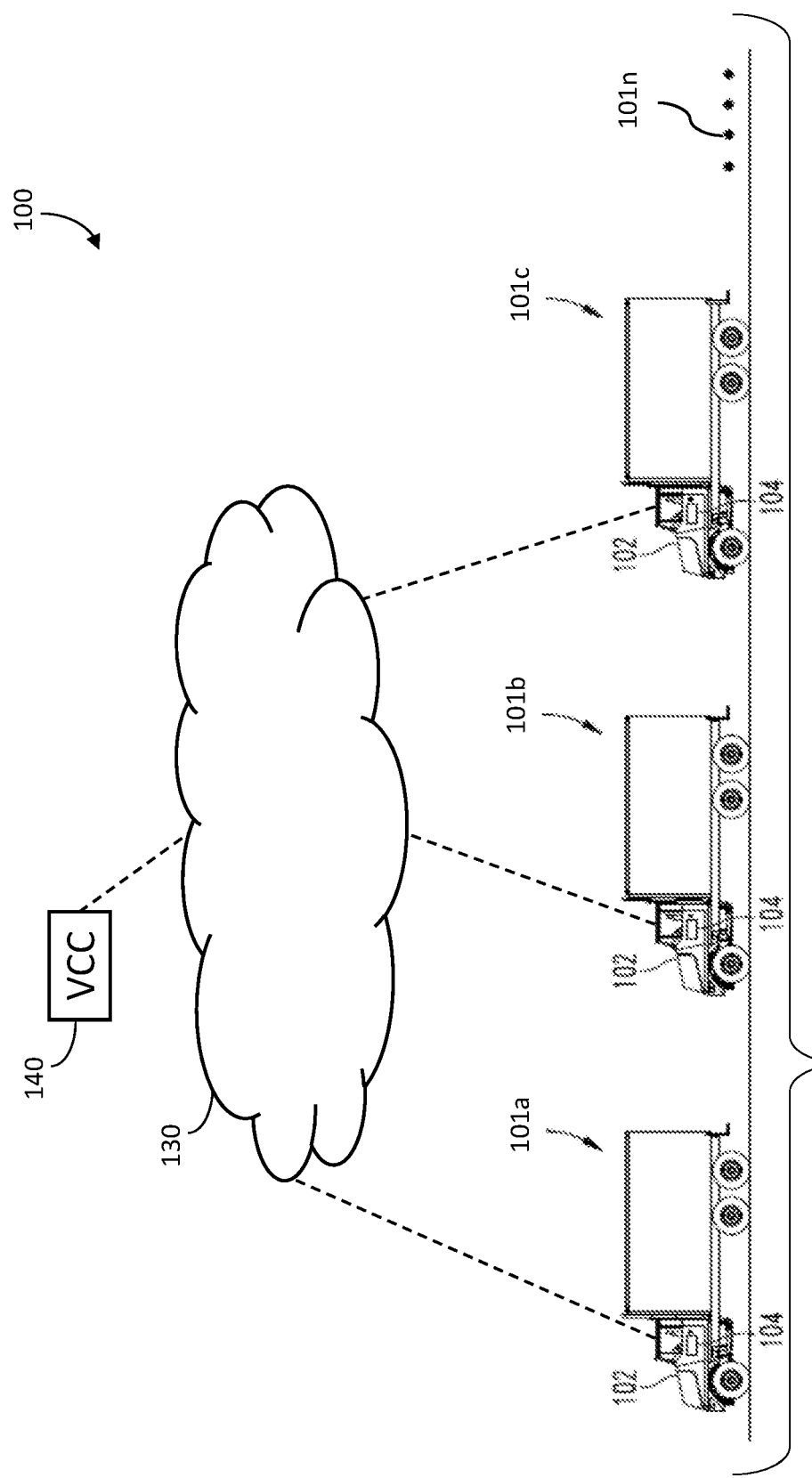
FIG. 1 is a schematic illustration of certain aspects of an exemplary vehicle cohort control system.

With reference to FIG. 1 there is illustrated a schematic view of an exemplary vehicle cohort control system 100 including a vehicle cohort 103 comprising a plurality of vehicles 101a, 101b, 101c and potentially additional vehicles as denoted by ellipsis 101n. Vehicles 101a, 101b, 101c . . . 101n may be referred to individually as a vehicle 101 and collectively as vehicles 101 or collectively as vehicle cohort 103. While vehicle cohort 103 is illustrated as comprising at least three vehicles 101, it shall be appreciated vehicle cohorts according to the present disclosure may comprise any number of two or more vehicles controlled or operating in a coordinated manner.

Vehicles 101 may be a variety of types of vehicles such as trucks, tractor-trailers, box trucks, busses, and passenger cars, among others. The vehicles 101 illustrated in FIG. 1 are depicted as tractor trailers, but any type of vehicle is thus contemplated herein. Some embodiments contemplate that vehicles 101 may each be the same or similar types of vehicles, for example, in the case of a commonly managed vehicle fleet. Some embodiments contemplate that vehicles 101 may comprise different types or classes of vehicles, for example, semi tractor-trailers and passenger cars. Each vehicle 101 includes a prime mover 102, such as an internal combustion engine, an electric motor, or hybrid engine-electric motor system, which is structured to output power to propel the vehicle 101. Some embodiments contemplate that prime movers 102 may each be the same or similar types of prime movers, for example, in the case of a commonly managed vehicle fleet. Some embodiments contemplate that prime movers 102 may comprise different types or classes of prime movers, for example, prime movers of different sizes, powers or types (e.g., diesel engine powertrains, gasoline engine powertrains, natural gas powertrains, hybrid-electric powertrains, and electric powertrains). For ease of description prime mover 102 may be referred to herein as an engine, however, it shall be understood that these references also apply to and include other types of prime movers.

Vehicle cohort 103 is illustrated in a cohort mode of operation, sometimes referred to as platooning or platooning operation, in which the vehicles act in a coordinated manner to reduce net fuel consumption by the vehicle cohort 103 and increase net operating efficiency of the vehicle cohort 103 relative to uncoordinated operation. Each vehicle 101 in vehicle cohort 103 utilizes one or more environmental sensors to determine its positioning relative to other vehicles in vehicle cohort 103. Examples of the types of sensor systems that may be utilized include radar systems, lidar systems, proximity sensor systems, and combinations of these and/or other sensor systems. Each vehicle 101 in vehicle cohort 103 also includes a wireless communication system allowing vehicle-to-vehicle (V2V) communication or vehicle-to-X (V2X) communication where X denotes a variety of possible types of external networks.

Each vehicle 101 includes a vehicle electronic control system (VECS) 104 which is structured to control and monitor operation of its respective vehicle 101, as well as to participate in cohort mode coordinated operation as disclosed herein. Each VECS 104 may be configured to provide autonomous or semi-autonomous control over the speed, positioning, prime mover operation and other internal system operation of its respective vehicle 101. Each VECS 104 typically comprises a plurality of integrated circuit-based electronic control units (ECU) or other control components which may be operatively coupled to one other over a communication bus or network such as a controller area network (CAN) and which are structure to implement various controls, for example, an engine ECU structure to control and monitor operation of an engine and engine accessories, a transmission ECU structured to control and monitor operation of a transmission, a wireless communication ECU structured to control ex-vehicle wireless communications, and one or more environmental sensor ECUs structured to control operation of an environmental sensor system may be provided. It shall be appreciated that the control logic and control processes disclosed herein may be performed by controllers or controls which are implemented in dedicated control components of VECS 104 (e.g., in a dedicated ECU or other dedicated control circuity) or may be implemented in a distributed fashion across multiple control components of VECS (e.g., through coordinated operation of an engine ECU, a transmission ECU, a wireless communication ECU and an environmental sensor ECU).

The ECUs and other control components of VECs 104 may comprise of digital circuitry, analog circuitry, or a hybrid combination of both of these types. The ECUs and other control components of VECs 104 can be programmable, an integrated state machine, or a hybrid combination thereof. The ECUs and other control components of VECs 104 can include one or more Arithmetic Logic Units (ALUs), Central Processing Units (CPUs), memories, limiters, conditioners, filters, format converters, or the like which are not shown to preserve clarity. In one form, the vehicle electronic control system 104 is of a programmable variety that executes algorithms and processes data in accordance with operating logic that is defined by executable program instructions stored in a non-transitory memory medium (e.g., software or firmware). Alternatively or additionally, operating logic for the vehicle electronic control system 104 can be at least partially defined by hardwired logic or other hardware.

The environmental sensor and wireless communication capabilities of vehicles 101 allow their operation to be coordinated using direct or indirect communication. Such operation may be referred to as coordinated operation or cohort mode operation. For example, vehicles 101 may accelerate or brake simultaneously, or in a coordinated sequence, maintain a particular distance relative to one other, or maintain a particular offset relative to one another. Coordinated operation also allows a closer following distance between vehicles by compensating for or eliminating reacting distance needed for human reaction. Coordinated operation of vehicle cohort 103 further allows for operation that reduces net fuel consumption or increases net efficiency of the vehicle cohort 103. One or more of the vehicles 101 may in some embodiments, be equipped with aerodynamic capability (wind assist panels on cab & trailer, aerodynamic tractor body) that creates a laminar flow of air (tunnel effect) that greatly reduces air drag. Other vehicles among vehicles 101 may be spaced close enough to the vehicle taking advantage of a wind break tunnel to increase fuel economy. It shall be appreciated that the controls disclosed herein can mitigate aerodynamic losses both by adjusting vehicle following distance(s) and vehicle offset.

Coordinated operation of vehicle cohort 103 may be provided at least in part by a vehicle cohort controller (VCC) 140. In the embodiment of FIG. 1, VCC is provided as a cloud-based control system in operative communication with the VECS 104 of each of vehicles 101 via one or more communication networks 130. In other embodiments, VCC 140 may be provided in a vehicle 101 and may be a part of a VECS 104 or implemented in an independent electronic control system. In other embodiments, certain functionalities of VCC 140 may be distributed among two or more vehicles or two or more VECS 104 or other vehicle-based electronic control systems.

Figure 2:
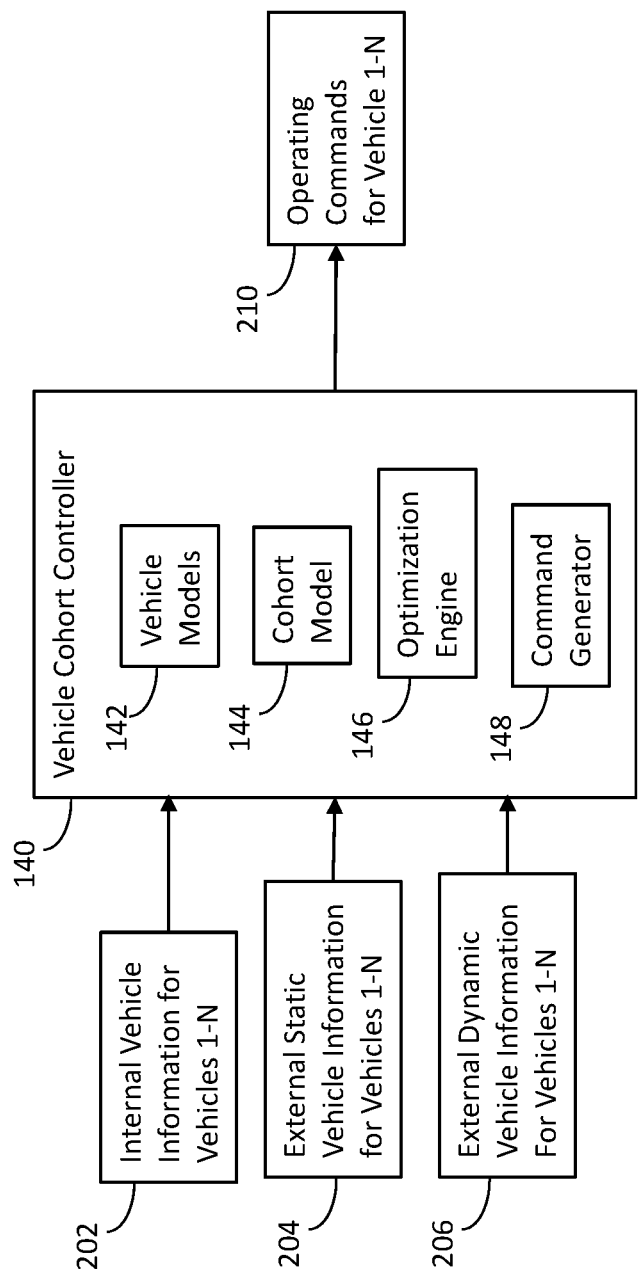
FIG. 2 is a schematic illustration of certain aspects of an exemplary vehicle cohort controller.

With reference to FIG. 2 there is illustrated a schematic depiction of one exemplary form of VCC 140. In the illustrated embodiment, VCC 140 is structured to perform an optimization of a total vehicle cohort power ($P_{Total}$) or a total vehicle cohort energy ($E_{Total}$) for operating the vehicle cohort over a given route of travel. It shall be appreciated that total energy and total power are related as described by equation (1): $E_{Total} = \int_0^T P_{Total} dt$, where $E_{Total}$ is the total energy used by the cohort over the route of travel, $P_{Total}$ is the total power used by the cohort over the route of travel, and T is the total time required for the vehicle cohort to complete the route of travel. Thus, a model or an optimization of total energy may be performed in terms of either power or energy depending on computational convenience and, as used herein a model or an optimization of total energy shall be understood to include a model or an optimization of total power.

VCC 140 is configured to and operable to model total vehicle cohort power (e.g., the total power consumed by all vehicles in the vehicle cohort) as a function of the total power of each vehicle of the cohort. In one form VCC 140 may model total vehicle cohort power in accordance with equation (2): $P_{Total} = \sum_{i=1}^{N} P_{T_i}$ where $P_{Total}$ is the instantaneous total vehicle cohort power, i is an integer denoting each vehicle in the vehicle cohort, N is the total number of vehicles in the cohort, and $P_{T_i}$ is the instantaneous power consumed by the i-th vehicle (i.e., each individual vehicle).

VCC 140 may be further configured to and operable to model the total vehicle cohort power as a function of a set of equations accounting for different aspects of the total power consumed by each individual vehicle in accordance with equation (3):

$$P_{Total} = \sum_{i=1}^{N} \left( P_{T_i}^{roll} + P_{T_i}^{Ptrloss} + P_{T_i}^{acl} \right) + \sum_{i=1}^{N} P_{T_i}^{Fan}(D[\,], Y, O, Aw, Fb, Vs) + \sum_{i=1}^{N} P_{T_i}^{aero}(D[\,], Y, O, Aw, C_{Db}, Fb, Vs) + \sum_{i=1}^{N} P_{T_i}^{eng\_acc}(Dc)$$

where, for each i-th vehicle (i.e., each individual vehicle), $P_{T_i}^{roll}$ is the power a vehicle consumes to overcome rolling resistance, $P_{T_i}^{Ptrloss}$ is the power a vehicle consumes to overcome powertrain losses, $P_{T_i}^{acl}$ is the power a vehicle consumes to achieve acceleration, $P_{T_i}^{Fan}$ is the power a vehicle consumes through parasite losses attributable to the radiator fan(s), $P_{T_i}^{aero}$ is the power a vehicle consumes to overcome aerodynamic losses, $P_{T_i}^{eng\_acc}$ is the power consumed by operation of engine components such as fuel pump, water pump, etc. and other accessories such as air compressors, air conditioners and other accessories which may consume mechanical or electrical power generated by an engine, D[ ] is set of distances between a vehicle and one or more adjacent vehicles in the cohort which may be aligned, offset and/or angled in any direction relative to one another, Y is vehicle yaw, O is offset in the direction transverse to the direction of travel (e.g., lateral position in a lane) between a vehicle and the vehicle adjacent to it in the cohort, Aw is the angle of wind incident to a vehicle, Fb is the wind speed or base wind flow, $C_{Db}$ is the baseline drag coefficient, Vs is the vehicle road speed and Dc is accessory duty cycle.

It shall be appreciated that models in accordance with equation (2) and equation (3) may be utilized in modeling vehicle cohort operation over a given route of travel or a given operating horizon by performing an integration or summation over the time or distance over a given route of travel or a given operating horizon.

Figure 4:
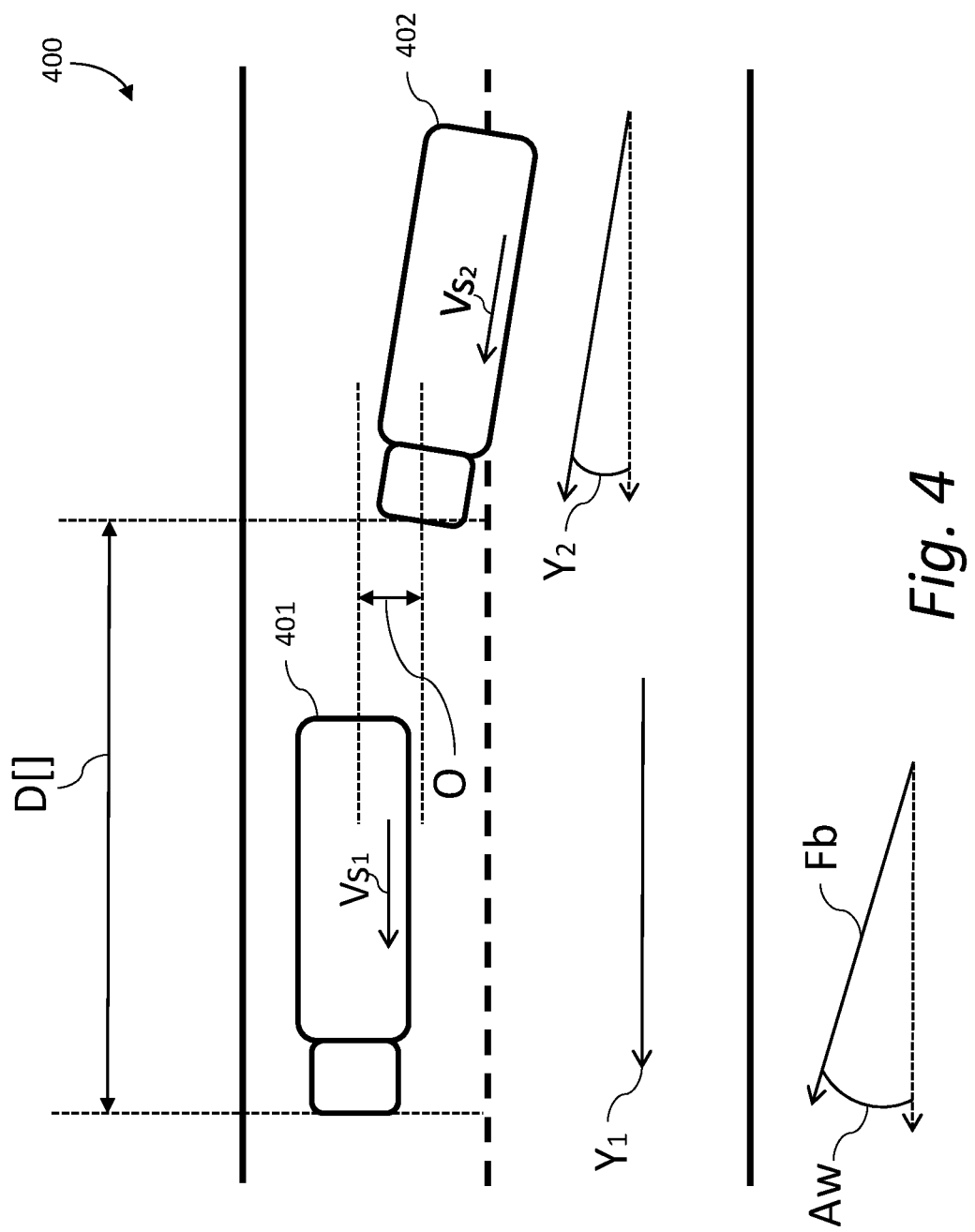
FIG. 4 is a schematic illustration of certain aspects of an exemplary vehicle cohort.

With reference to FIG. 4 there is illustrated one non-limiting example of a vehicle cohort 400 including a vehicle 401 and a vehicle 402. The embodiment of FIG. 4 provides one example of the parameters Aw, Fb, D[ ] and O relative to vehicles 401 and 402, as well as parameters Vs (with $Vs_1$ corresponding to vehicle 401 and $Vs_2$ corresponding to vehicle 402) and Y (with $Y_1$ corresponding to vehicle 401 and $Y_2$ corresponding to vehicle 402). In the embodiment of FIG. 4, the distance between vehicles D[ ] is defined as the distance relative to corresponding points along the length of vehicles, in this instance the respective front center points of the vehicles. Under this definition a value of D[ ]=0 would indicate that the vehicles are at the same distance along the route of travel as may occur when vehicles are offset in a side-by-side arrangement. In other embodiments the distance between vehicles D[ ] may be defined as the distance relative to different points along the length of vehicles, for example, the distance between rear center point of a forward vehicle and the front center point of a following vehicle. In the embodiment of FIG. 4, the angles Aw and Y are defined relative to forward road direction vector (e.g., direction of a lane line). In other embodiments, these angles may be defined relative to other coordinate systems, for example, using a constant vector such as a vector pointing to zero-degrees North.

VCC 140 is configured to and operable to maintain a plurality of vehicle models 142 in accordance with equation (3) or another computer model of vehicle operation based upon input received by VCC 140. In general terms the inputs received by VCC 140 may be categorized as internal vehicle information 202 which is specific to each vehicle in a cohort, external static vehicle information 204 which may be the same for each vehicle in the cohort or may vary among vehicles, and external dynamic vehicle information 206 which is specific to each vehicle in a cohort.

Internal vehicle information 202 comprises certain information from which the values of the vehicle models 142 (e.g., the values of the terms of equation (3)) may be determined. In general, internal vehicle information 202 comprises information about vehicle components and immediate surroundings that vary over time and is therefore only precisely valid for a given vehicle at a given point in time, although the degree of time precision may vary in practice. Internal vehicle information is typically determined using and available from on-board sensors and communication with other vehicle powertrain components. Examples of internal vehicle information include but are not limited to vehicle mass, gear selection, engine speed, vehicle speed Vs, vehicle transmission state and based transmission loss, vehicle acceleration, vehicle distance D, vehicle yaw Y, vehicle offset O, vehicle wind angle Aw, vehicle temperatures such as coolant temperature and oil temperature, ambient temperature, ambient humidity, and current road grade.

External static vehicle information 204 generally comprises information about conditions outside of the vehicle that do not change with time or change relatively slowly (e.g., daily, weekly, monthly etc.). Such information may be determined from map based data, communication with other devices outside of the vehicle. Examples of such information include but are not limited to road grade over a given route of travel, intersections, curvature, charging locations in the case of electric vehicles, and construction zones over a given route of travel to name several examples. External static vehicle information 204 may be used to determine look-ahead information or a prediction of the future conditions that will be encountered by the vehicle cohort. Look-ahead information, in turn, may be taken into account when performing the optimizations and determining operating commands for vehicles as described herein.

It shall be appreciated that the calculations or computations disclosed herein may be performed at a given instant or offline over a horizon or repeated as a form of model predictive control (MPC). Furthermore, it should be appreciated that future, look-ahead information for all parameters utilized by such calculations or computations may be available as a look-ahead information and that the optimizations disclosed herein may be performed using the look-ahead information.

External dynamic vehicle information 206 generally comprises information about things outside of the vehicle that change frequently over time. Such information may be determined using V2X communication. Examples of such information include but not limited to traffic density, weather forecast, traffic light phases, road conditions, fuel price at a given location and electricity price at a given location. External dynamic vehicle information 206 may be taken into account when performing the optimizations and determining operating commands for vehicles as described herein.

VCC 140 is configured to and operable to maintain a vehicle cohort model 144 in accordance with the equation(s) or another computer model of vehicle operation based upon the vehicle models 142. VCC 140 is further configured to and operable to operate an optimization engine 146 to perform an optimization on the terms of one or both of vehicle cohort model 144 and vehicle models 142. Optimization engine 146 may be structured to perform the optimization using a number of techniques including, for example, dynamic programming or dynamic optimization techniques, Pontryagin's maximum principle, convex optimization techniques, machine learning techniques, neural network or combinations of these and other optimization techniques as would occur to one of skill in the art with the benefit of the present disclosure. Regardless of the particular techniques utilized, optimization engine 146 is structured to perform an optimization, considers and determines both vehicle cohort operating parameters and individual vehicle operating parameters in order to minimize total vehicle cohort power ($P_{Total}$) or a total vehicle cohort energy ($E_{Total}$).

Vehicle cohort operating parameters are parameters defining positioning of vehicles in the cohort relative to one another and may be expressed as the position of each vehicle relative to an absolute coordinate system or a relative coordinate system wherein the positioning of each vehicle is defined relative to one or more other vehicles. The power that vehicles in the cohort consume to overcome aerodynamic losses ($P_{T_i}^{aero}$) may be a primary factor in the optimization of vehicle cohort operating parameters. In such instances, optimization engine 146 may determine vehicle cohort operating parameters to define absolute or relative positions for each vehicle in the cohort in order to minimize the term $P_{T_i}^{aero}$ for each vehicle as part of an overall optimization. For example, in a model according to equation (3) the variables impacting the terms $P_{T_i}^{aero}$ are distances between vehicles (D), vehicle yaw (Y) and offset (O), which are controllable by VCC 140, as well as wind angle (Aw) and wind speed (Fb), which are not controllable by VCC 140. Accordingly, optimization engine 146 may be structured to determine values for the controllable variables that minimize the terms $P_{T_i}^{aero}$ while accounting for the effect of the uncontrollable variables.

Individual vehicle operating parameters are parameters defining the internal operating conditions of a given vehicle in the vehicle cohort, for example, gear selection, fueling, engine speed, radiator fan operation. Each of the loads on the engine may be a primary factor in the optimization of individual vehicle operating parameters. Accordingly, any engine operating command which influences vehicle load may be specified by and controlled in response to the optimization.

In certain embodiments optimization engine 146 is structured to perform a sequential optimization in which the optimal vehicle cohort operating parameters are first determined and the optimal individual vehicle operating parameters which provide or are consistent with the optimal vehicle cohort operating parameters are then determined. Accordingly, optimization engine 146 may determine individual vehicle operating parameters in order to minimize the terms $P_{T_i}^{roll}$, $P_{T_i}^{Ptrloss}$, $P_{T_i}^{acl}$, $P_{T_i}^{Fan}$, $P_{T_i}^{eng\_acc}$ while concurrently providing the optimal vehicle cohort operating parameters specified by the minimization of the terms $P_{T_i}^{aero}$. In certain embodiments optimization engine 146 is structured to perform a parallel optimization in which optimal vehicle cohort operating parameters and optimal individual vehicle operating parameters are determined in parallel and differences between the resulting vehicle operating commands are then reconciled by a further optimization that minimizes losses or power increases that are created through the reconciliation. In certain embodiments, optimization engine 146 is structured to perform an iterative optimization which repeats either a sequential or a parallel optimization a plurality of times to converge on a final set of vehicle operating commands.

It shall be appreciated that the optimization techniques described above may be implemented in connection with a look-ahead horizon so that the optimizations consider future predicted model states and determine optimal vehicle cohort operating parameters and optimal individual vehicle operating parameters that minimize total vehicle cohort power ($P_{Total}$) or total vehicle cohort energy ($E_{Total}$) over the look-ahead horizon or the total mission.

VCC 140 further includes a command generator 148 which is configured to and operable to determine a plurality of operating commands 210 for respective vehicles of the cohort that can be transmitted to and executed by the vehicles in order to provide and implement the optimized vehicle cohort operating parameters and the optimized individual vehicle operating parameters.

From the foregoing description it can be seen that VCC 140 may determine and cause to be executed a number of vehicle control commands. A number of significant but non-limiting examples of which shall now be described. In certain optimization scenarios, commands may be generated to permit higher engine torque for a predetermined and typically limited period of time of distance, for example, a torque limit increase may be provided on an uphill to maintain the vehicle alignment and position in a cohort.

In certain optimization scenarios, heavier vehicles which may not have enough torque to maintain following distance or alignment with respect to another on an uphill which would cause a cascading effect of increased aero drag and then increased power demand to climb the hill. In such scenarios, torque increase commands may be generated for the heavier vehicles in order to maintain the optimal following distances or alignments of the cohort. In such scenarios, lighter vehicles can alternatively or additionally slow down to appropriate speed to maintain the optimal distance and alignment with respect to other vehicles.

Certain optimization scenarios, distance between vehicles in a cohort may be decreased as the cohort travels on an uphill grade. Such optimization scenarios take advantage of the fact that on an uphill grade, brake power required to stop the vehicle in given distance is small due to mass and grade force. Thus, for a given braking power, the vehicle can be stopped in shorter distance. Accordingly, following distance may be decreases which has the benefit of reducing the power required to overcome aerodynamic drag.

Certain optimization scenarios account for the fact that on an uphill grade, vehicle engines can become warm quickly, requiring the radiator fan to run, thereby further increasing demand on engine. Smaller following distances can compound engine heating due to decreases ram-air requiring increasing fan operation. In such scenarios, look-ahead information, wind direction information, wind velocity information and vehicle position in the cohort can be utilized to proactively cool before the uphill grade is encountered. Such pre-cool down operation may be running the engine fan in advance of a hill. Alternatively, the engine temperature limit triggering fan operation may be increased to allow the engine to slightly overheat on the uphill grade so as to avoid running engine fan in anticipation of an opportunity for increased ram-air cooling on a following downhill.

Certain optimization scenarios account for the fact that, on a downhill, different vehicles may accelerate faster or slower due to mass differences and aerodynamic drag differences due to relative alignment in the cohort. This may result in different friction brake and engine brake usage among different vehicles in the cohort. In such scenarios, increasing the relative distances on downhill may be commanded to adjust drag on vehicles to avoid faster accelerations.

Certain optimization scenarios provide coordinating neutral coasting on a downhill road grade. Neutral costing can be managed intelligently, some vehicles being in neutral gear to accelerate faster and some vehicles remaining coasting for longer duration, or reengaging earlier to maintain a good location in the cohort. A pre-cooling or engine cooling on downhill can be achieved by turning the fan on during downhill to increase engine motoring losses as well as change aerodynamic signature.

Certain optimization scenarios mitigate impact of turns on wind direction and disturbance caused by it, by aligning vehicles laterally to maintain sufficient drag to the vehicle while consuming less fuel, in practical application this will be limited by lane to truck width, to lane width ratio, and wind direction. In such scenarios a vehicle may be aligned in a lane based on wind direction to account for extra drag and reduce yaw movement.

Certain optimization scenarios may take advantage of the fact that on a downhill road grade, there may be multiple options to control the vehicle speed, by creating different types of energy losses including friction brakes, engine brakes, and active aerodynamic devices which can be employed on the vehicle to create extra drag and maintaining a sufficient separation distance. Such scenarios may optimize selection of these options to reduce total power for a deceleration operation.

Certain optimization scenarios may adjust predictive cruise control (PCC) acceleration rates on two nearby trucks on pre-uphill or pre-downhill. For example, the rate of PCC acceleration may be increased on a downhill to take advantage of downhill acceleration in view of an upcoming uphill which will accommodate close following distance.

Figure 3:
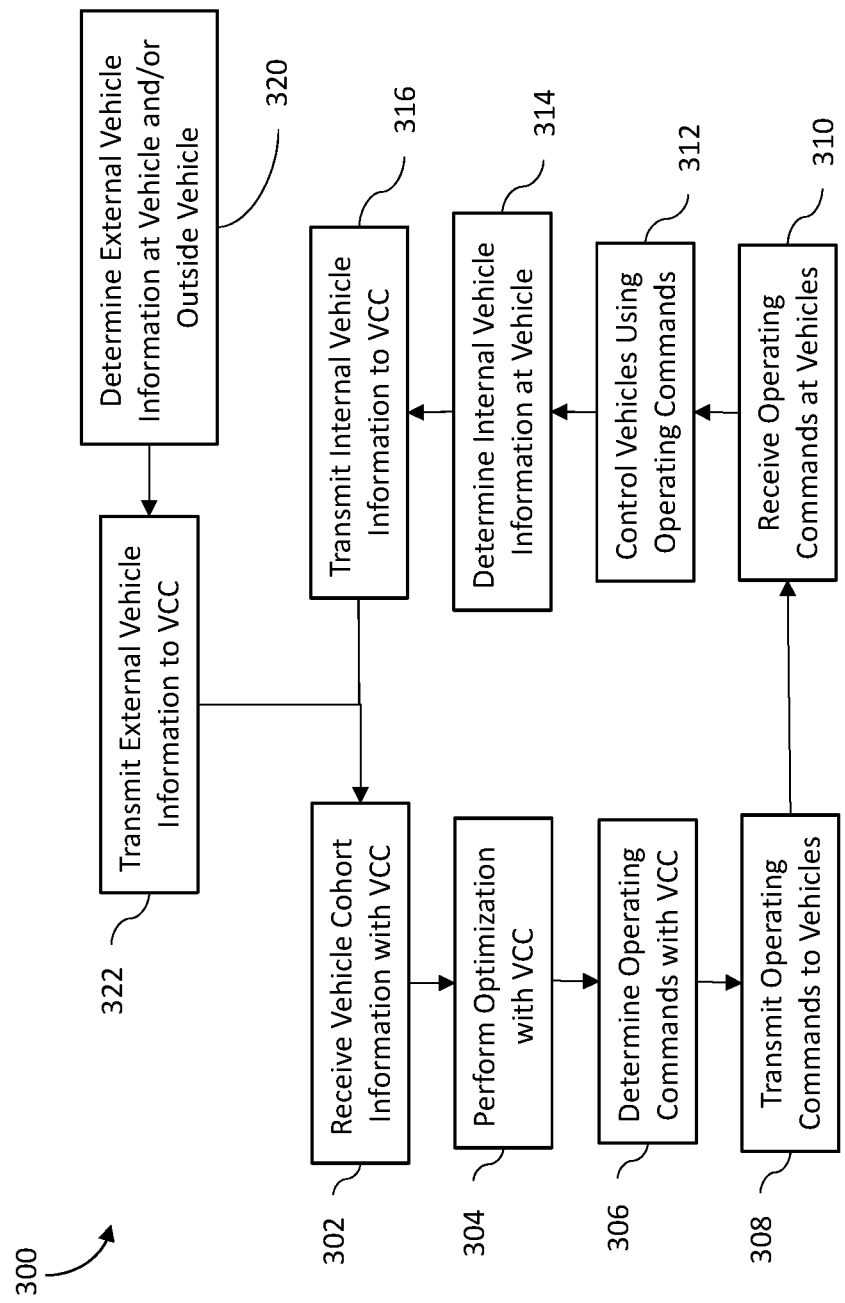
FIG. 3 is a flow diagram of certain aspects of an exemplary vehicle cohort control process.

With reference to FIG. 3 there is illustrated a flow diagram of an exemplary vehicle cohort control process 300. Process 300 includes operation 302 in which a vehicle cohort controller such as VCC 140 receives vehicle cohort information comprising internal vehicle information for a plurality of vehicles, external static vehicle information for the plurality of vehicles, and external dynamic vehicle information for the plurality of vehicles. From operation 302, process 300 proceeds to operation 304.

Operation 304 performs an optimization using a vehicle cohort controller such as VCC 140 to determine a plurality of vehicle cohort operating parameters and a plurality of individual vehicle operating parameters effective to minimize total vehicle cohort power ($P_{Total}$) or total vehicle cohort energy ($E_{Total}$) In performing such an optimization, operation 304 may utilize the techniques described in connection with FIG. 2 or elsewhere herein. From operation 304, process 300 proceeds to operation 306.

Operation 306 determines a plurality of vehicle operating commands which are executable by respective vehicles in a cohort to provide cohort and vehicle operating conditions specified by vehicle cohort operating parameters and a plurality of individual vehicle operating parameters. From operation 306, process 300 proceeds to operation 308. Operation 308 transmits the operating commands to the vehicles of the cohort. From operation 308, process 300 proceeds to operation 310. At operation 310 the vehicles of the cohort receives the operating commands. From operation 310, process 300 proceeds to operation 312. At operation 312 each vehicle in the cohort executes the operation commands applicable to that vehicle. From operation 312, process 300 proceeds to operation 314.

At operation 314 each vehicle determines internal vehicle information comprising information about vehicle components and immediate surroundings that vary over time, such as internal vehicle information 202. From operation 314, process 300 proceeds to operation 316. At operation 316 each of the vehicles in the cohort transmits its internal vehicle information to the vehicle cohort controller. From operation 316, process 300 proceeds to operation 302.

Concurrently with the above operations, operation 320 determines external static vehicle information for the plurality of vehicles and external dynamic vehicle information for the plurality of vehicles. Operation 320 may be performed externally to the vehicles of the cohort or at least in part internally to one or more vehicles of the cohort. Operation 320 may be structured to repeat periodically, to repeat when updated or changed external vehicle information is available or to repeat based on a request received from the vehicle cohort controller. From operation 320, process 300 proceeds to 322 which transmits the external static vehicle information for the plurality of vehicles and the external dynamic vehicle information for the plurality of vehicles to the vehicle cohort controller.

While illustrative embodiments of the disclosure have been illustrated and described in detail in the drawings and foregoing description, the same is to be considered as illustrative and not restrictive in character, it being understood that only certain exemplary embodiments have been shown and described and that all changes and modifications that come within the spirit of the claimed inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A system comprising:
a vehicle cohort controller in operative communication with a plurality of vehicles of a vehicle cohort, the vehicle cohort controller being configured to:
store a model of total power or energy consumed by operation of the vehicle cohort in one or more non-transitory memory media,
perform an optimization of total power or energy consumed by operation of the vehicle cohort using the model, the optimization providing a plurality of optimized vehicle cohort operating parameters defining positioning of the plurality of vehicles relative to one another and a plurality of optimized individual vehicle operating parameters defining one or more internal operating conditions of individual vehicles of the vehicle cohort,
determine a plurality of vehicle operating commands corresponding to respective ones of the plurality of vehicles, the plurality of vehicle operating commands configured to modify operation of the plurality of vehicles to produce the optimized vehicle cohort operating parameters and the optimized individual vehicle operating parameters; and
transmit the plurality of vehicle operating commands to the respective ones of the plurality of vehicles effective to modify operation of the plurality of vehicles to produce the optimized vehicle cohort operating parameters and the plurality of optimized individual vehicle operating parameters.

2. The system of claim 1 wherein the plurality of optimized vehicle cohort operating parameters comprise, for each of the plurality of vehicles, a distance in a direction of travel from one or more other vehicles of the vehicle cohort and an offset in a direction transverse to the direction of travel from one or more other vehicles of the vehicle cohort.

3. The system of claim 2 wherein the distance and the offset for each of the plurality of vehicles comprise variables in a component of the model modeling power consumed by each of the plurality of vehicles to overcome aerodynamic loss.

4. The system of claim 3 wherein the component of the model modeling power consumed by each of the plurality of vehicles to overcome aerodynamic loss further includes variables accounting for vehicle yaw, wind speed, wind direction, and vehicle speed.

5. The system of claim 2 wherein the distance and the offset for each of the plurality of vehicles comprise variables in a component of the model modeling power consumed by operation of a fan of each of the plurality of vehicles.

6. The system of claim 5 wherein the component of the model modeling power consumed by operation of a fan of each of the plurality of vehicles further includes variables accounting for vehicle yaw, wind speed, wind direction, and vehicle speed.

7. The system of claim 1 wherein the optimized individual vehicle operating parameters include a powertrain torque and the plurality of vehicle operating commands comprise at least one torque limit increase corresponding to an individual vehicle of the vehicle cohort.

8. A method comprising:
operating a vehicle cohort controller in operative communication with a plurality of vehicles of a vehicle cohort to perform the operations of:
storing a model of total power or energy consumed by operation of the vehicle cohort in one or more non-transitory memory media,
performing an optimization of total power or energy consumed by operation of the vehicle cohort using the model, the optimization providing a plurality of optimized vehicle cohort operating parameters defining positioning of the plurality of vehicles relative to one another and a plurality of optimized individual vehicle operating parameters defining one or more internal operating conditions of individual vehicles of the vehicle cohort,
determining a plurality of vehicle operating commands corresponding to respective ones of the plurality of vehicles, the plurality of vehicle operating commands configured to modify operation of the plurality of vehicles to produce the optimized vehicle cohort operating parameters and the optimized individual vehicle operating parameters; and
transmitting the plurality of vehicle operating commands to the respective ones of the plurality of vehicles effective to modify operation of the plurality of vehicles to produce the optimized vehicle cohort operating parameters and the plurality of optimized individual vehicle operating parameters.

9. The method of claim 8 wherein the plurality of optimized vehicle cohort operating parameters comprise, for each of the plurality of vehicles, a distance in a direction of travel from one or more other vehicles of the vehicle cohort and an offset in a direction transverse to the direction of travel from one or more other vehicles of the vehicle cohort.

10. The method of claim 9 wherein the distance and the offset for each of the plurality of vehicles comprise variables in a component of the model modeling power consumed by each of the plurality of vehicles to overcome aerodynamic loss.

11. The method of claim 10 wherein the component of the model modeling power consumed by each of the plurality of vehicles to overcome aerodynamic loss further includes variables accounting for vehicle yaw, wind speed, wind direction, and vehicle speed.

12. The method of claim 9 wherein the distance and the offset for each of the plurality of vehicles comprise variables in a component of the model modeling power consumed by operation of a fan of each of the plurality of vehicles.

13. The method of claim 12 wherein the component of the model modeling power consumed by operation of a fan of each of the plurality of vehicles further includes variables accounting for vehicle yaw, wind speed, wind direction, and vehicle speed.

14. The method of claim 8 wherein the optimized individual vehicle operating parameters include a powertrain torque and the plurality of vehicle operating commands comprise at least one torque limit increase corresponding to an individual vehicle of the vehicle cohort.

* * * * *